US009565466B2

(12) United States Patent
Hsu et al.

(10) Patent No.: US 9,565,466 B2
(45) Date of Patent: Feb. 7, 2017

(54) VIDEO PROCESSING METHOD AND VIDEO PROCESSING SYSTEM

(75) Inventors: Shih-Hsuan Hsu, Taipei (TW); Chun-Han Chen, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 337 days.

(21) Appl. No.: 13/025,349

(22) Filed: Feb. 11, 2011

(65) Prior Publication Data

US 2011/0234908 A1    Sep. 29, 2011

Related U.S. Application Data

(60) Provisional application No. 61/317,740, filed on Mar. 26, 2010.

(51) Int. Cl.
*H04N 5/50*        (2006.01)
*H04N 21/434*    (2011.01)
*H04N 21/431*    (2011.01)
*H04N 21/488*    (2011.01)

(52) U.S. Cl.
CPC ...... *H04N 21/4345* (2013.01); *H04N 21/4312* (2013.01); *H04N 21/4882* (2013.01)

(58) Field of Classification Search
CPC ............ H04N 5/44504; H04N 5/44513; H04N 5/44543; H04N 5/4401; H04N 21/485; H04N 21/45455; H04N 21/458; H04N 21/47205; H04N 21/4725; H04N 21/4728; H04N 21/4854; H04N 21/4856; H04N 21/4858
USPC ......................................... 348/569, 725, 468
See application file for complete search history.

(56) References Cited

U.S. PATENT DOCUMENTS

| 5,459,522 | A | | 10/1995 | Pint | |
|---|---|---|---|---|---|
| 5,734,853 | A | * | 3/1998 | Hendricks | H04H 20/06 348/E5.002 |
| 5,969,770 | A | * | 10/1999 | Horton | H04N 5/4401 348/569 |
| 6,147,714 | A | * | 11/2000 | Terasawa | H04N 5/44508 348/564 |

(Continued)

FOREIGN PATENT DOCUMENTS

| TW | 591515 | 8/2001 |
|---|---|---|
| TW | I254577 | 2/2003 |

(Continued)

OTHER PUBLICATIONS

English language translation of abstract of TW I254577 (pp. 2-4 of publication, published Feb. 14, 2003).

(Continued)

*Primary Examiner* — An Son P Huynh
(74) *Attorney, Agent, or Firm* — McClure, Qualey & Rodack, LLP

(57) ABSTRACT

A video processing system is provided. A video signal processor receives a video signal, processes the video signal to obtain video images and program information and stores the program information in a program information buffer. A microprocessor issues an on screen display (OSD) paint command and accesses the program information buffer to obtain the program information. An OSD control module receives the OSD paint command and acquires the program information from the microprocessor, and converts the program information and initial attributes to form an OSD image in response to the OSD paint command.

21 Claims, 5 Drawing Sheets

(56) References Cited

U.S. PATENT DOCUMENTS

| | | | |
|---|---|---|---|
| 6,275,267 B1* | 8/2001 | Kobayashi | H04N 5/46 348/555 |
| 6,380,984 B1* | 4/2002 | Inoue | H04N 5/44508 348/563 |
| 6,487,722 B1* | 11/2002 | Okura | G06F 3/0481 348/E5.105 |
| 6,681,285 B1* | 1/2004 | Ng | G06F 13/1605 348/718 |
| 6,681,395 B1* | 1/2004 | Nishi | H04H 60/07 348/E5.105 |
| 6,839,071 B1* | 1/2005 | Miyamoto | H04L 12/40117 345/520 |
| 6,911,986 B1* | 6/2005 | Aneja | H04N 5/4401 345/545 |
| 7,594,177 B2* | 9/2009 | Jojic | G06F 17/30852 715/720 |
| 2001/0005400 A1* | 6/2001 | Tsujii | G11B 27/11 375/240.29 |
| 2002/0037159 A1* | 3/2002 | Goto | G11B 27/034 386/243 |
| 2002/0171765 A1* | 11/2002 | Waki | G09G 5/14 348/E5.105 |
| 2002/0171857 A1* | 11/2002 | Hisatomi et al. | 358/1.13 |
| 2003/0051243 A1* | 3/2003 | Lemmons | H04N 5/44543 725/44 |
| 2003/0052905 A1* | 3/2003 | Gordon | H04N 5/44543 715/700 |
| 2003/0101452 A1* | 5/2003 | Hanaya | H04N 5/44543 725/38 |
| 2003/0142212 A1* | 7/2003 | Grimes | H04N 3/20 348/173 |
| 2003/0231259 A1* | 12/2003 | Yui | G06F 3/14 348/564 |
| 2004/0019608 A1* | 1/2004 | Obrador | G06F 17/30044 |
| 2004/0073941 A1* | 4/2004 | Ludvig | H04N 21/2355 725/113 |
| 2004/0085452 A1* | 5/2004 | Suzu | H04N 5/44513 348/180 |
| 2004/0095358 A1* | 5/2004 | Takagi et al. | 345/589 |
| 2004/0196906 A1* | 10/2004 | Gordon | H04N 5/4401 375/240.12 |
| 2005/0012761 A1* | 1/2005 | Shiomi | H04N 5/4401 345/660 |
| 2005/0058432 A1* | 3/2005 | Kennedy | 386/81 |
| 2005/0102623 A1* | 5/2005 | Chin | H04N 5/44513 715/716 |
| 2005/0114901 A1* | 5/2005 | Yui | H04N 7/163 725/100 |
| 2005/0166237 A1* | 7/2005 | Kawakami | H04H 60/72 725/50 |
| 2005/0168642 A1* | 8/2005 | Sakamoto | G06F 17/2223 348/569 |
| 2005/0270372 A1* | 12/2005 | Henninger | G08B 13/19667 348/143 |
| 2006/0127041 A1* | 6/2006 | Shimizu | G11B 27/3081 386/244 |
| 2006/0184970 A1 | 8/2006 | Lin | |
| 2006/0232708 A1* | 10/2006 | Kawa et al. | 348/569 |
| 2006/0290817 A1* | 12/2006 | Yui et al. | 348/564 |
| 2007/0169094 A1* | 7/2007 | Cho | H04N 5/76 717/168 |
| 2007/0201822 A1* | 8/2007 | Kusunoki | G11B 20/10 386/297 |
| 2008/0022394 A1* | 1/2008 | Park | 726/18 |
| 2008/0049143 A1* | 2/2008 | Liao et al. | 348/569 |
| 2008/0320395 A1* | 12/2008 | Yuasa | H04N 1/00283 715/735 |
| 2009/0009511 A1* | 1/2009 | Ueda | H04N 5/4401 345/419 |
| 2009/0059074 A1* | 3/2009 | Suematsu et al. | 348/569 |
| 2009/0073502 A1* | 3/2009 | Ishizaki | 358/445 |
| 2009/0207305 A1* | 8/2009 | Fujita et al. | 348/468 |
| 2009/0256967 A1* | 10/2009 | Suzuki | H04N 5/44504 348/569 |
| 2010/0074594 A1* | 3/2010 | Nakamura et al. | 386/92 |
| 2010/0134685 A1* | 6/2010 | Nakamura | G09G 5/14 348/569 |
| 2010/0220241 A1* | 9/2010 | Ida | 348/725 |
| 2010/0262912 A1* | 10/2010 | Cha | G11B 27/105 715/719 |
| 2010/0292982 A1* | 11/2010 | Dube et al. | 703/24 |

FOREIGN PATENT DOCUMENTS

| | | |
|---|---|---|
| TW | 200746825 | 12/2007 |
| TW | I292669 | 1/2008 |
| TW | I303947 | 12/2008 |

OTHER PUBLICATIONS

English language translation of abstract of TW 200746825 (published Dec. 16, 2007).

English language translation of abstract of TW I292669 (published Jan. 1, 2008).

English language translation of abstract of TW I303947 (published Dec. 1, 2008).

* cited by examiner

| Frame Position (X, Y) |
|---|
| Frame Color |
| Frame Width |
| Frame Height |
| ...... |

FIG. 3

| String_1 |
|---|
| String_2 |
| String_3 |
| ...... |

FIG. 4

VIDEO PROCESSING METHOD AND VIDEO PROCESSING SYSTEM

CROSS REFERENCE TO RELATED APPLICATIONS

This application claims the benefit of U.S. Provisional Application No. 61/317,740 filed Mar. 26, 2010 and entitled "A SYSTEM AND METHOD FOR GENERATING AN OSD IMAGE". The entire contents of which are hereby incorporated by reference.

BACKGROUND OF THE INVENTION

Field of the Invention

The invention relates to a method for generating an on screen display (OSD) image.

Description of the Related Art

A digital television (DTV) displays not only a digital video signal on a screen, but also program information related to the digital video signal. Generally, the on screen display (OSD) data displayed on screen for showing program information to users may include, but not limited to, program guides, channel lists, and OSD banners. FIG. 1 shows an exemplary OSD image (i.e. an OSD banner) displayed on a screen. The OSD banner includes a frame and the program information. The frame defines an area of the screen for displaying the OSD banner. The frame can be described by its relevant attributes, e.g. position on the screen, frame width, frame height, and frame color etc. In the exemplary image shown in FIG. 1, the OSD banner includes program information revealed by three textual strings, including channel name, period, and close caption information. The channel name, e.g. NBC, represents the currently displayed channel. The period, e.g. 19:00-21:00, represents the start time and the end time of the currently displayed program. The close caption information, e.g. CC1, is a predefined string representing that a type of close caption has been displayed on the screen. The string "CC1" may be replaced by a representation signal, e.g. "eng" reprinting English, which could be retrieved from the broadcast digital video signal.

In the following paragraphs, a novel method for generating an on screen display (OSD) image is provided.

BRIEF SUMMARY OF THE INVENTION

A video processing method and video processing system are provided. An embodiment of a video processing system comprises a video signal processor, a microprocessor and an on screen display (OSD) control module. The video signal processor receives a video signal, processes the video signal to obtain video images and program information, and stores the program information in a program information buffer. The microprocessor issues an OSD paint command and accesses the program information buffer to obtain the program information. The OSD control module receives the OSD paint command and acquires the program information from the microprocessor, and converts the program information and initial attributes to form an OSD image in response to the OSD paint command.

Another embodiment of a video processing method for a video processing system comprising a program information buffer comprises: receiving a video signal and processing the video signal to obtain a plurality of video images and program information; storing the program information in the program information buffer; issuing an on screen display (OSD) paint command to begin painting an OSD image; acquiring the program information from the program information buffer in response to the OSD paint command; and generating the OSD image according to the program information and a plurality of initial attributes to be shown on the OSD image.

Another embodiment of a video processing system comprises a video signal processor and an on screen display (OSD) control module. The video signal processor comprises a program information buffer, receives a video signal, processes the video signal to obtain a plurality of video images and program information and stores the program information in the program information buffer. The OSD control module receives an OSD paint command, and acquires the program information from the program information buffer and converts the program information and a plurality of initial attributes to form an OSD image in response to the OSD paint command.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 3 shows an exemplary data structure of an OSD information memory which does not contain the program information;

FIG. 4 shows an exemplary data structure of a program information buffer;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
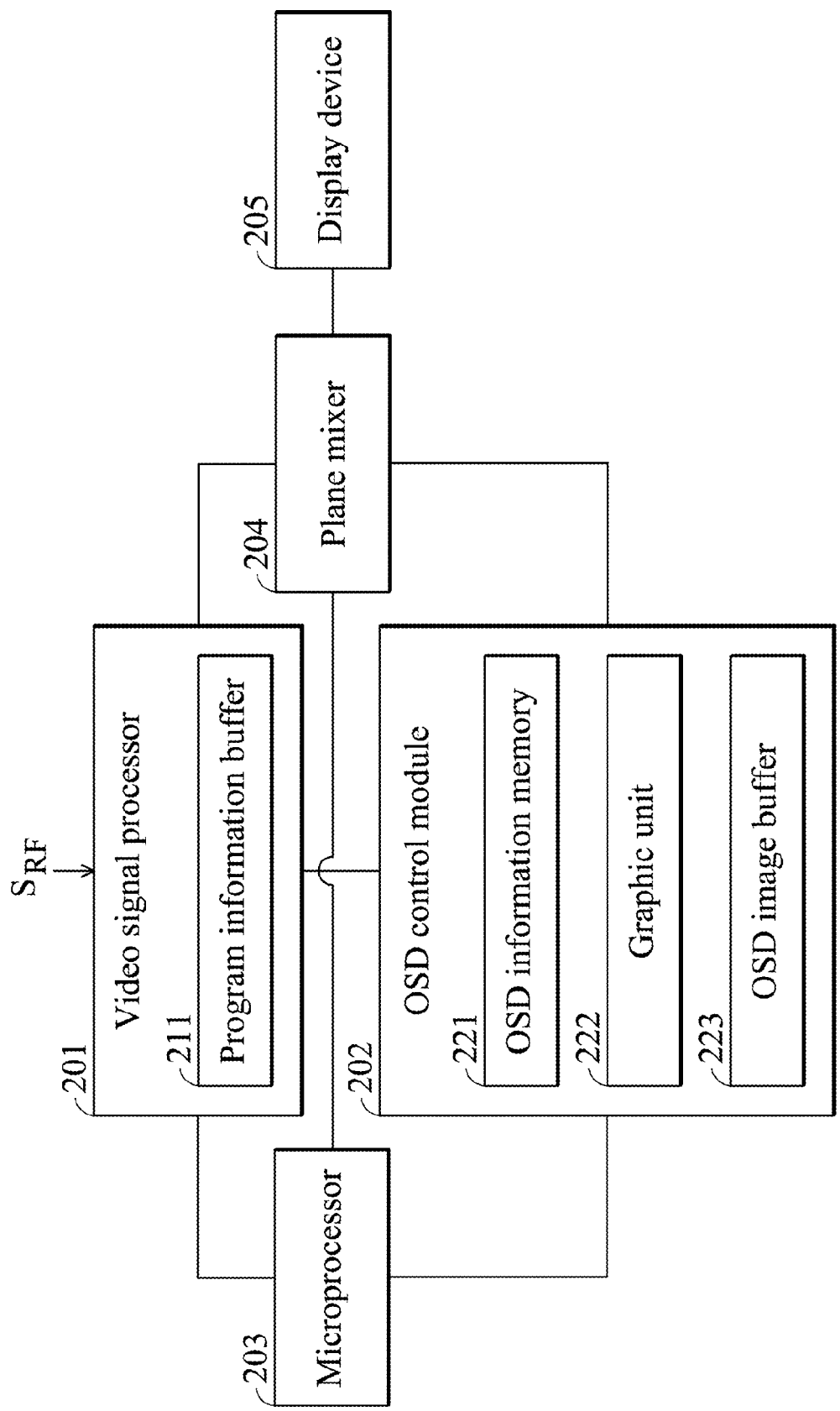
FIG. 2 illustrates a block diagram of a video processing system according to an embodiment of the invention.

FIG. 2 illustrates a block diagram of a video processing system according to an embodiment of the invention. The video processing system comprises a video signal processor 201, an on screen display (OSD) control module 202, a microprocessor 203, and a plane mixer 204. The microprocessor 203 generates a plurality of control signals to control the video signal processor 201, the OSD control module 202 and the plane mixer 204, to display a video image and/or an OSD image on a display device 205. According to an embodiment of the invention, the video signal processor 201 receives a video signal, for example, an RF signal $S_{RF}$, from an air interface and processes the received video signal to obtain video images and program information. The video signal processor 201 outputs the video image to the plane mixer 204, and stores the program information into a program information buffer 211. According to an embodiment of the invention, the program information stored in the program information buffer 211 may be in a character code format, e.g. an ASCII code.

The OSD control module 202 outputs an OSD image in response to the control signals. According to an embodiment of the invention, the OSD control module 202 comprises an OSD information memory 221, a graphic unit 222, and an OSD image buffer 223. The OSD information memory 221 stores initial attributes related to the OSD image. The graphic unit 222 converts the initial attributes and the program information to form the OSD image, and stores the OSD image into the OSD image buffer 223. The video signal processor 201 and the OSD control module 202 respectively output the video image and the OSD image to the plane mixer 204 in response to the control signals. The plane mixer 204 selectively outputs the video image and the OSD image to the display device 205 in response to the control signals. According to an embodiment of the invention, the plane mixer 204 may further blend the video image and the OSD image, so that the display device 205 can display the superposed video image and OSD image.

According to an embodiment of the invention, the initial attributes stored in the OSD information memory 221 comprises attributes related to the OSD image. For example, the attributes correspond to, but not limited to, an OSD banner to be shown on the OSD image. As previously described, the OSD banner may comprise a frame and the program information. The frame defines an area of the screen for displaying the OSD banner and may be described by the relevant initial attributes. The initial attributes may comprise, for example but are not limited to, position of the frame on the screen, frame width, frame height, and frame color etc.

According to an embodiment of the invention, different from the conventional design, the program information stored in the program information buffer 211 by the video signal processor 201 will not be stored in the OSD information memory 221. FIG. 3 shows an exemplary data structure of an OSD information memory which does not contain the program information. As shown in FIG. 3, only the initial attributes related to the OSD image, such as frame position information (X & Y), frame color information, frame width information, and frame height information . . . etc., are stored in the OSD information memory. In the embodiments of the invention, the initial attributes are predefined by the video processing system (that is, not obtained from the broadcast bit stream carried in the RF signals).

Figure 1:
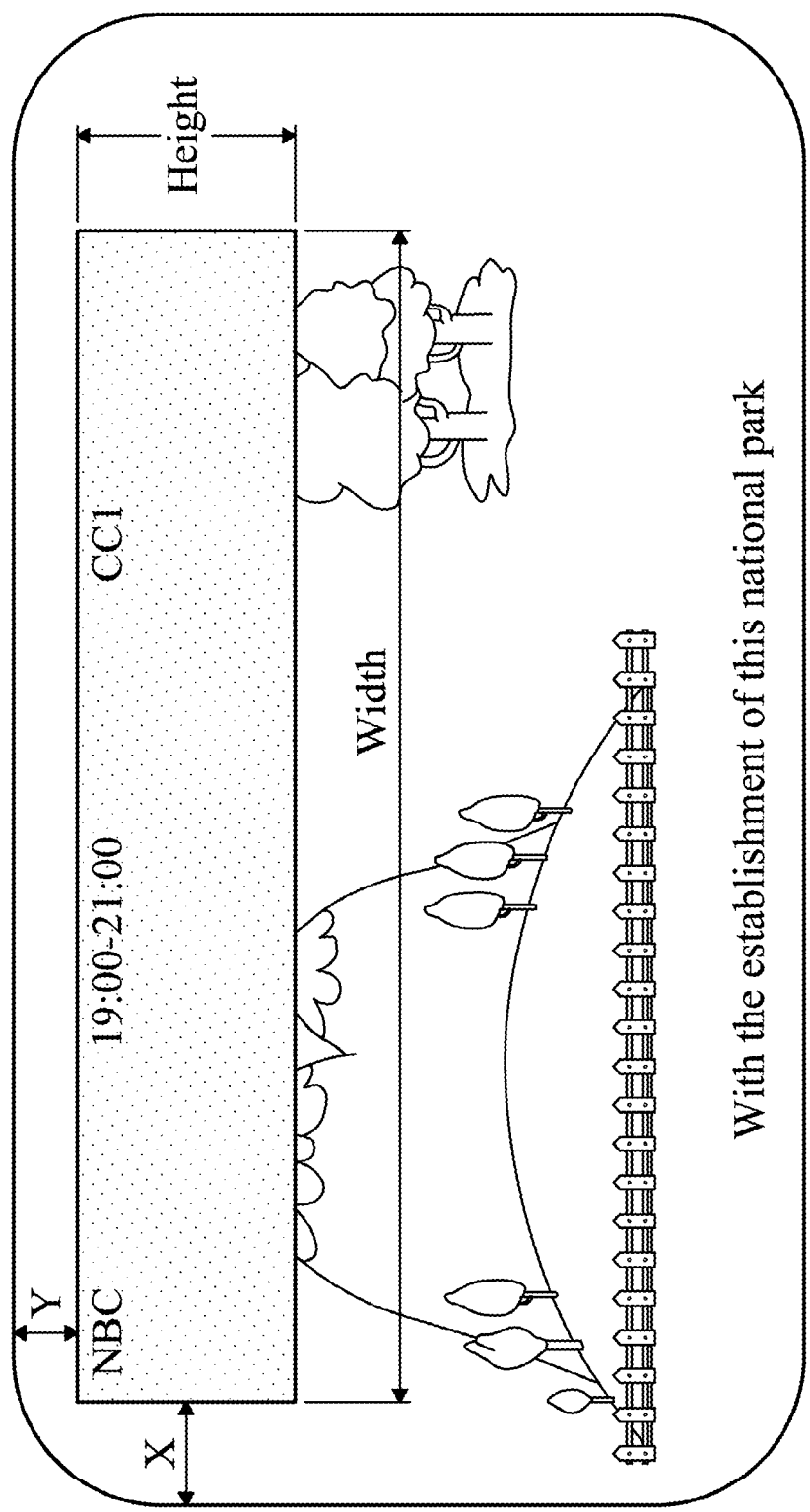
FIG. 1 shows an OSD banner displayed on a screen.

FIG. 4 shows an exemplary data structure of a program information buffer. According to the embodiments of the invention, the program information may comprise a plurality of textual strings obtained from the broadcast bit stream carried in the RF signals, such as the three textual strings shown in FIG. 1 for providing the channel name, period, and close caption information relevant to currently played programs. As shown in FIG. 4, the plurality of textual strings is stored in the program information buffer. According to an embodiment of the invention, since program information is not stored in the OSD information memory 221, when an OSD paint command is issued, the microprocessor 203 may further transfer the program information to the OSD control module 202 for painting of the OSD image.

Figure 5:
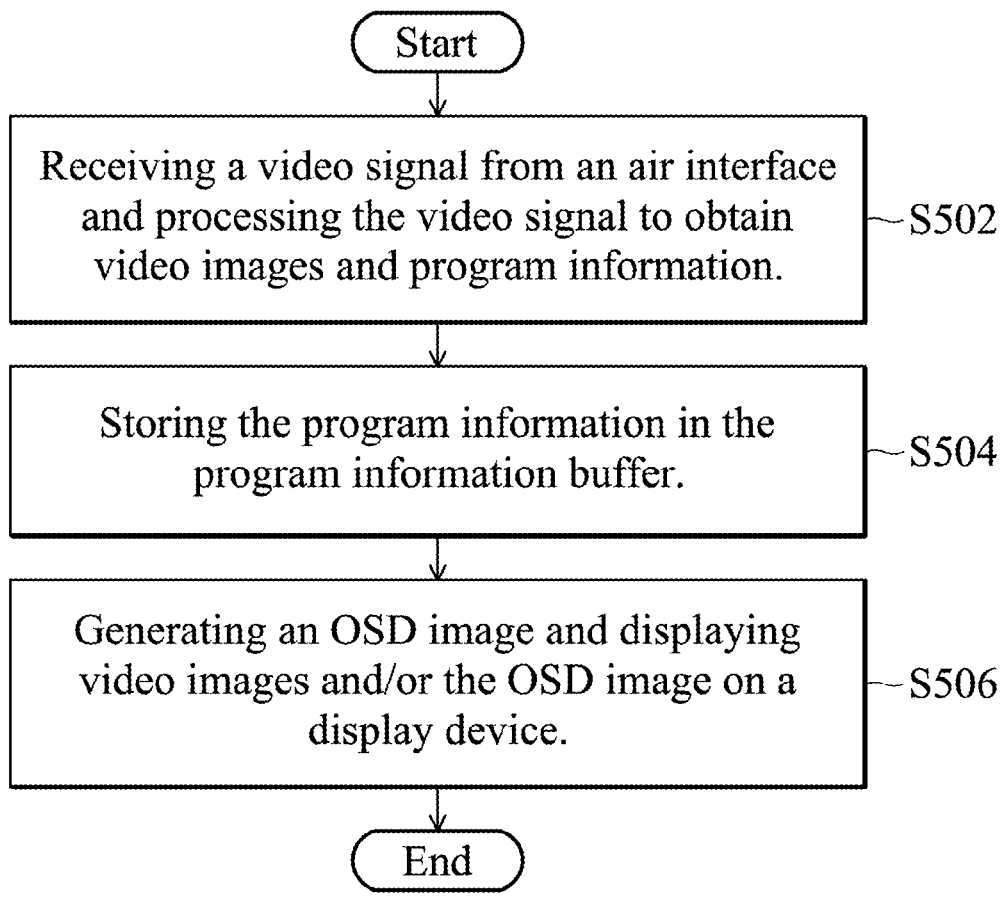
FIG. 5 shows a flow chart of a video processing method according to an embodiment of the invention.

FIG. 5 shows a flow chart of a video processing method according to an embodiment of the invention. In step S502, the video signal processor 201 receives a video signal, for example a broadcast bit stream from an air interface, and processes the video signal to obtain a plurality of video images and program information. Next, in step S504, the video signal processor 201 stores the program information in the program information buffer 211. Next, in step S506, the microprocessor 203 generates control signals to control the video signal processor 201, the OSD control module 202 and the plane mixer 204, to generate an OSD image and display the video images and/or the OSD image on a display device 205.

Figure 6:
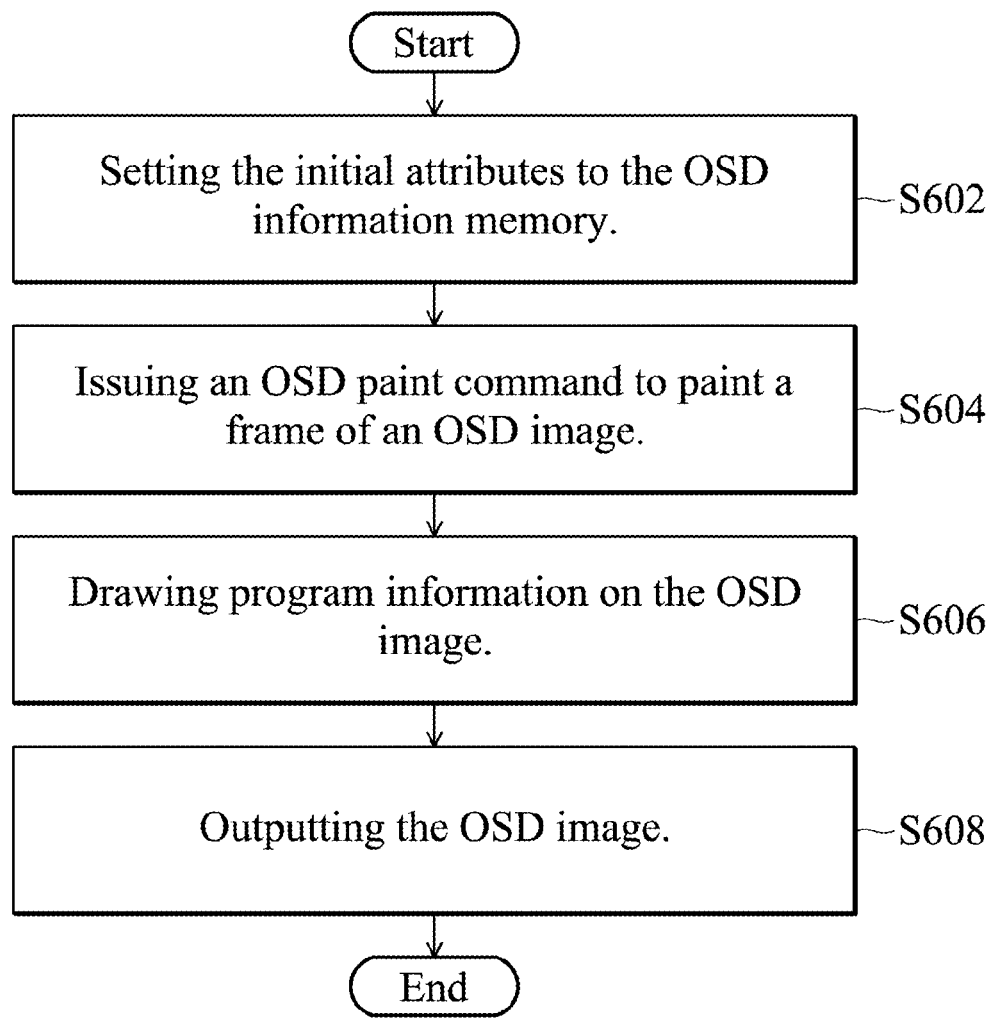
FIG. 6 further shows a flow chart of a method for generating the OSD image according to an embodiment of the invention.

FIG. 6 further shows a flow chart of a method for generating the OSD image according to an embodiment of the invention. In step S602, the microprocessor 203 sets (i.e. stores) the initial attributes related to the OSD image to the OSD information memory 221. As previously described, the initial attributes may comprise, but are not limited to, attributes which corresponds to the frame of an OSD banner, e.g. frame position, frame width, frame height, and frame color. Those attributes describe an area on the screen for displaying the OSD banner of the OSD image. According to the embodiments of the invention, the initial attributes are predefined by the video processing system (that is, not obtained from the broadcast bit stream carried in the RF signals). Next, in step S604, the microprocessor 203 issues an OSD paint command to direct the OSD control module 202 to begin painting a frame of an OSD image. According to an embodiment of the invention, the graphic unit 222 starts to convert the initial attributes stored in the OSD information memory 221 into a frame of the OSD image in response to the OSD paint command, and stores the frame in the OSD image buffer 223. Practically, the frame of the OSD image stored in the OSD image buffer 223 may be in a bitmap format. The bitmap format frame image has an array of bit data that defines a display image.

Following, in step S606, the microprocessor 203 controls the video signal processor 201 and the OSD control module 202 to convert the character code format program information stored in the program information buffer 211 into bitmap format program information. The bitmap format program information is further stored into the OSD image buffer 223, and may be overlapped with the bitmap format frame image generated in the previous step S604. To be more specific, in step S606, the microprocessor 203 transfers the program information from the program information buffer 211 to the graphic unit 222. The graphic unit 222 accordingly converts the program information into the bitmap format program information.

According to an embodiment of the invention, the OSD control module 202 may issue a program information requiring request to the microprocessor 203 for requiring the program information after receiving the OSD paint command. In response to the program information requiring request, the microprocessor 203 may access the program information buffer 211 to obtain the program information, and transfer the obtained program information to the OSD control module 202. The graphic unit 222 may further convert the program information received from the microprocessor 203 into bitmap format program information. In other words, the program information is directly converted into the bitmap format program information without being stored into the OSD information memory 221.

After steps S604 and S606, the OSD image buffer 223 may contain a complete OSD image (including the frame and the program information). Finally, in step S608, the microprocessor 203 controls the OSD control module 202 to output the OSD image to the plane mixer 204. The plane mixer 204 further selectively outputs the video image and the OSD image to the display device 205 in response to the control signals of the microprocessor 203.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcodes or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A video processing system, comprising:
    a video signal processor for receiving a video signal and for processing the video signal to obtain a plurality of video images and program information, and storing the program information in a program information buffer;
    an on screen display (OSD) information memory for storing a plurality of initial attributes related to an OSD image;
    a microprocessor for issuing an OSD paint command and accessing the program information buffer to obtain the program information;
    an OSD control module for receiving the OSD paint command directing the OSD control module to begin painting a frame of the OSD image, the OSD control module acquiring the program information though the microprocessor, and converting the program information and the plurality of initial attributes to form the OSD image in response to the OSD paint command, wherein the plurality of initial attributes are defined by the video processing system receiving the video signal, wherein the OSD control module comprises: a graphic unit directly converting the program information and the plurality of initial attributes to form the OSD image without storing the program information in the OSD information memory; and an OSD image buffer storing the OSD image comprising a frame and the program information; and
    a plane mixer for receiving the plurality of video images and the OSD image and selectively outputting the video images and the OSD image to a display device in response to control signals from the microprocessor.

2. The video processing system as claimed in claim 1, wherein the microprocessor accesses the program information buffer to obtain the program information and transfers the program information to the OSD control module in response to a program information requiring request, and wherein the OSD control module transmits the program information requiring request to the microprocessor after receiving the OSD paint command.

3. The video processing system as claimed in claim 1, wherein the program information buffer is comprised in the video signal processor.

4. The video processing system as claimed in claim 1, wherein the plane mixer further blends the video images and the OSD image so that the OSD image is superimposed on the plurality of video images.

5. The video processing system as claimed in claim 1, wherein the plurality of initial attributes correspond to attributes of the OSD image.

6. The video processing system as claimed in claim 5, wherein the attributes of the OSD image comprise at least one of: a frame position of the OSD image, a frame width of the OSD image, a frame color of the OSD image, or any combination thereof.

7. The video processing system as claimed in claim 1, wherein the OSD control module converts the plurality of initial attributes into a frame of the OSD image.

8. The video processing system as claimed in claim 1, wherein the plurality of initial attributes define a size and a location of the OSD image.

9. The video processing system as claimed in claim 1, wherein the OSD control module converts the plurality of initial attributes into a frame of the OSD image in response to the OSD paint command, and draws the converted program information on the frame to form the OSD image.

10. A video processing method for a video processing system comprising a program information buffer, comprising:
    receiving a video signal and processing the video signal, by a video signal processor, to obtain a plurality of video images and program information;
    storing, by the video signal processor, the program information in the program information buffer;
    storing, by an on screen display (OSD) information memory, a plurality of initial attributes related to an OSD image;
    issuing an OSD paint command and accessing the program information buffer, by a microprocessor, to obtain the program information;
    receiving, by an OSD control module, the OSD paint command directing the OSD control module to begin painting a frame of the OSD image in response to the OSD paint command;
    acquiring, by the OSD control module, the program information through the microprocessor in response to the OSD paint command;
    converting, by the OSD control module, the program information and the plurality of initial attributes to form the OSD image in response to the OSD paint command, wherein the plurality of initial attributes are defined by the video processing system, wherein the OSD control module comprises: a graphic unit directly converting the program information and the plurality of initial attributes to form the OSD image without storing the program information in the OSD information memory;
    storing, by an OSD image buffer, the OSD image comprising a frame and the program information; and
    receiving the plurality of video images and the OSD image and selectively outputting the video images and the OSD image, by a plane mixer, to a display device in response to control signals from the microprocessor.

11. The video processing method as claimed in claim 10, wherein acquiring, by the OSD control module, the program information through the microprocessor in response to the OSD paint command further comprises:
    issuing a program information requiring request in response to the OSD paint command by the OSD control module;
    accessing the program information buffer to obtain the program information in response to the program information requiring request by the microprocessor; and transferring the obtained program information to the OSD control module by the microprocessor.

12. The method as claimed in claim 10, further comprising:
blending the plurality of video images and the OSD image so that the OSD image is superimposed on the video images.

13. The method as claimed in claim 10, wherein the OSD image is generated in a bitmap format.

14. The video processing method as claimed in claim 10, wherein acquiring, by the OSD control module, the program information from the microprocessor in response to the OSD paint command and converting, by the OSD control module, the program information and a plurality of initial attributes to form an OSD image in response to the OSD paint command further comprises:
converting the plurality of initial attributes into a frame of the OSD image in response to the OSD paint command; and
drawing the converted program information on the frame to form the OSD image.

15. A non-transitory computer-readable medium embodying a program executable in a computing device, the program, when executed by the client device causes the computing device to perform:
receiving a video signal and processing the video signal by a video signal processor to obtain a plurality of video images and program information;
storing, by the video signal processor, the program information in the program information buffer;
storing, by an on screen display (OSD) information memory, a plurality of initial attributes related to an OSD image;
issuing an OSD paint command and accessing the program information buffer, by a microprocessor, to obtain the program information;
receiving, by an OSD control module, the OSD paint command directing the OSD control module to begin painting a frame of the OSD image in response to the OSD paint command;
acquiring, by the OSD control module, the program information through the microprocessor in response to the OSD paint command;
converting, by the OSD control module, the program information and the plurality of initial attributes to form the OSD image in response to the OSD paint command, wherein the plurality of initial attributes are defined by the video processing system;
directly converting, by a graphic unit, the program information and the plurality of initial attributes to form the OSD image without storing the program information in an OSD information memory;
storing, by an OSD buffer, the OSD image comprising a frame and the program information; and
receiving, by a plane mixer, the plurality of video images and the OSD image and selectively outputting the video images and the OSD image to a display device in response to control signals from the microprocessor.

16. The non-transitory computer-readable medium as claimed in claim 15, the program further performs:
receiving a program information requiring request, and accessing the program information buffer to obtain the program information and further transferring the program information to the OSD control module in response to the program information requiring request.

17. The non-transitory computer-readable medium as claimed in claim 16, wherein the program further performs transmitting the program information requiring request to the microprocessor after receiving the OSD paint command.

18. The non-transitory computer-readable medium as claimed in claim 15, wherein the program further performs blending the video images and the OSD image so that the OSD image is superimposed on the video images.

19. The non-transitory computer-readable medium as claimed in claim 15, wherein the program further performs converting the program information and the plurality of initial attributes to form the OSD image in a bitmap format.

20. The non-transitory computer-readable medium as claimed in claim 15, wherein the plurality of initial attributes define a size and a location of the OSD image.

21. The non-transitory computer-readable medium as claimed in claim 15, wherein the program further performs: converting the plurality of initial attributes into a frame of the OSD image in response to the OSD paint command, and drawing the converted program information on the frame to form the OSD image.

* * * * *